(12) United States Patent
Liao et al.

(10) Patent No.: US 7,267,039 B2
(45) Date of Patent: Sep. 11, 2007

(54) CIRCULAR SAWING MACHINE WITH A MULTI-DIRECTIONAL ADJUSTABLE LASER INDICATION DEVICE

(75) Inventors: Yi-Te Liao, Nan-Tou Hsien (TW); Ming-Hui Huang, Taichung Hsien (TW)

(73) Assignee: P & F Brother Industrial Corporation, Taichung (TW)

( * ) Notice: Subject to any disclaimer, the term of this patent is extended or adjusted under 35 U.S.C. 154(b) by 402 days.

(21) Appl. No.: 10/946,195

(22) Filed: Sep. 22, 2004

(65) Prior Publication Data

US 2005/0193881 A1    Sep. 8, 2005

(51) Int. Cl.
 *B26D 7/00*  (2006.01)
 *F21V 33/00*  (2006.01)
(52) U.S. Cl. .................... 83/520; 83/522.18; 83/471.3; 83/477.1; 362/89; 362/259
(58) Field of Classification Search .................. 83/520, 83/521, 581, 468.3, 432, 522.18, 471.3, 477.1; 362/89, 259, 253; 372/107, 97
See application file for complete search history.

(56) References Cited

U.S. PATENT DOCUMENTS

| | | | | |
|---|---|---|---|---|
| 4,939,863 A | * | 7/1990 | Alexander et al. | ............ 42/115 |
| 5,446,635 A | * | 8/1995 | Jehn | ........................... 362/259 |
| 6,976,764 B2 | * | 12/2005 | Cheng et al. | ................. 362/89 |

* cited by examiner

*Primary Examiner*—Boyer D. Ashley
*Assistant Examiner*—Omar Flores Sánchez
(74) *Attorney, Agent, or Firm*—Finnegan, Henderson, Farabow, Garrett & Dunner, L.L.P.

(57) ABSTRACT

A circular sawing machine has a multi-directional adjustable laser indication device that includes a body, a support rod disposed rotatably and movably within the body, and a laser lamp fixed on the support rod so as to form a visual indication line on a worktable. An angle-adjusting unit is operable to rotate the support rod so as to adjust the angle of the laser lamp. A transverse adjusting unit is operable to move the support rod within the body along a transverse direction of the worktable so as to adjust the position of the laser lamp.

9 Claims, 16 Drawing Sheets

CIRCULAR SAWING MACHINE WITH A MULTI-DIRECTIONAL ADJUSTABLE LASER INDICATION DEVICE

BACKGROUND OF THE INVENTION

1. Field of the Invention

This invention relates to a circular sawing machine, and more particularly to a circular sawing machine that includes a multi-directional adjustable laser indication device.

2. Description of the Related Art

Referring to FIG. 1, a first conventional circular sawing machine is shown to include a saw blade 100 and an indication device 10. The indication device 10 includes a housing 11 and a laser lamp 12 disposed within the housing 11 and servicing as a point light source. The housing 11 is formed with a hole 111, through which a light beam emitting from the laser lamp 12 can pass. Because the housing 11 is connected fixedly to the saw blade 100, the light beam forms a laser indication line on a workpiece to be cut. The indication line can extend across a top surface of the workpiece. However, because the hole 111 in the housing 11 is spaced apart from the saw blade 100 by a small distance, the indication line is not located directly under the saw blade 100. This will cause errors in the cutting positions. Furthermore, because the indication line is fixed, inconvenient use will be incurred.

Referring to FIGS. 2 and 3, a second conventional circular sawing machine 2 is shown to include a worktable 3, a supporting seat 4 disposed rotatably on a rear portion of the worktable 3, a sliding unit 5 disposed slidably on the supporting seat 4, a front supporting seat 6 connected fixedly to a front end of the sliding unit 5, and a cutting unit 7 disposed rotatably on the front supporting seat 6 and having a saw blade 8. The cutting unit 7 can be pressed downwardly toward a workpiece 200 so as to perform the cutting operation. The sliding unit 5 can be operated to move the cutting unit 7 to and fro. Therefore, the workpiece 200 can be fully cut off. An indication device 20 is disposed on the front supporting seat 6, and includes a movable seat 21 disposed movably within a slide slot 601 in the front supporting seat 6, a laser lamp 22 embedded within the movable seat 21, an adjusting member 23 disposed threadably on the front supporting seat 6 and operable to move the movable seat 21 to move along the direction shown by the arrowheads in FIG. 3, and a cover 24 for covering the slide slot 601 in the front supporting seat 6. The cover 24 is formed with a window hole 241. The laser lamp 22 can emit a light through the window hole 241 to form an indication line 25 on the workpiece 200. Although the indication line 25 is disposed directly under the saw blade 8, and is movable by rotating the adjusting member 23, it has a fixed length. As a result, when the workpiece 200 is comparatively wide, the indication line 25 cannot extend across a top surface of the workpiece 200, thereby resulting in errors in the cutting positions.

SUMMARY OF THE INVENTION

The object of this invention is to provide a circular sawing machine that includes a multi-directional adjustable laser indication device, which enables formation of an indication line on the cutting positions of the workpiece to be cut.

According to this invention, a circular sawing machine has a multi-directional adjustable laser indication device that includes a body, a support rod disposed rotatably and movably within the body, and a laser lamp fixed on the support rod so as to form a visual indication line on a worktable. An angle-adjusting unit is operable to rotate the support rod so as to adjust the angle of the laser lamp. A transverse adjusting unit is operable to move the support rod within the body along a transverse direction of the worktable so as to adjust the position of the laser lamp.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
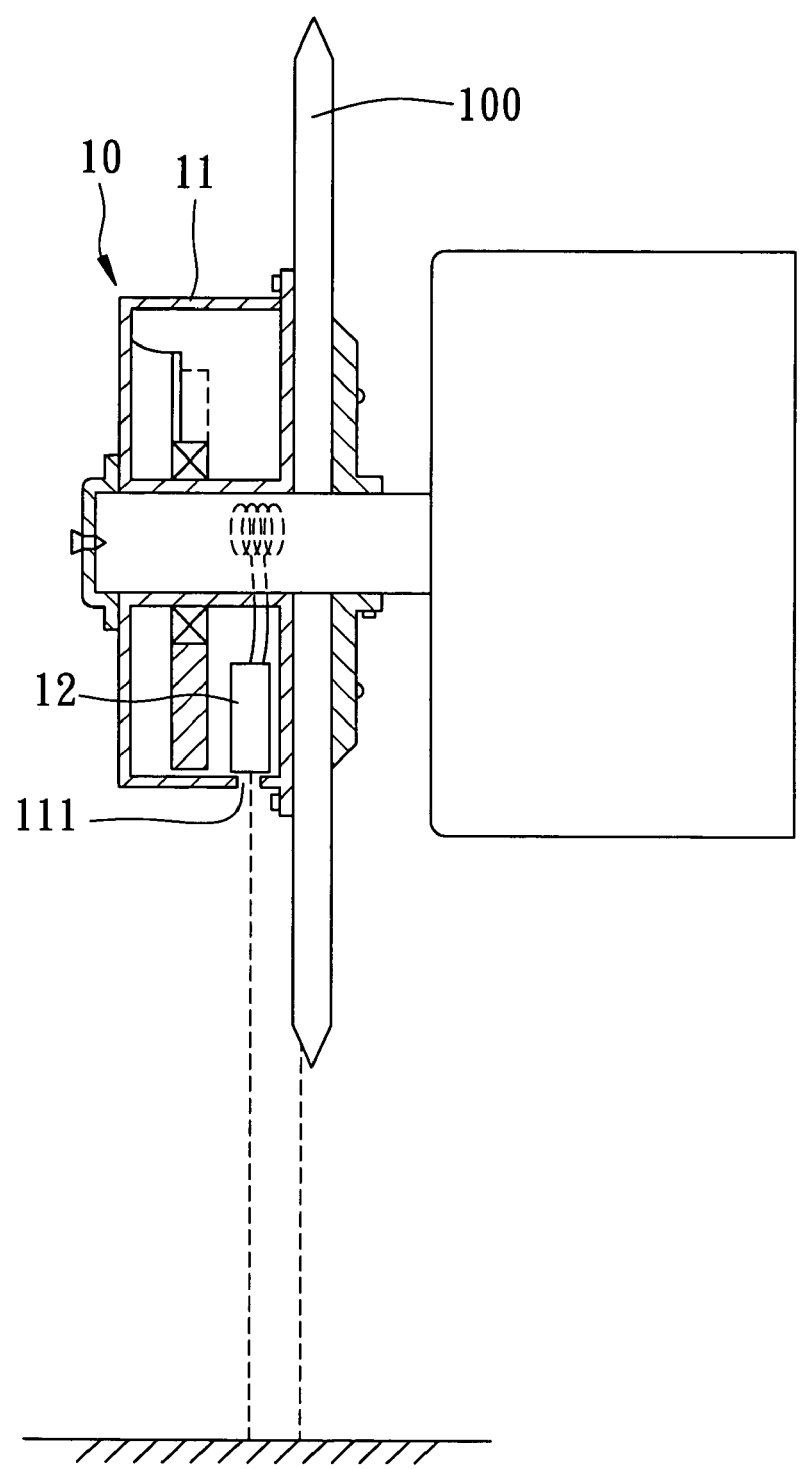
FIG. 1 is a sectional view of a first conventional circular sawing machine.
Figure 2:
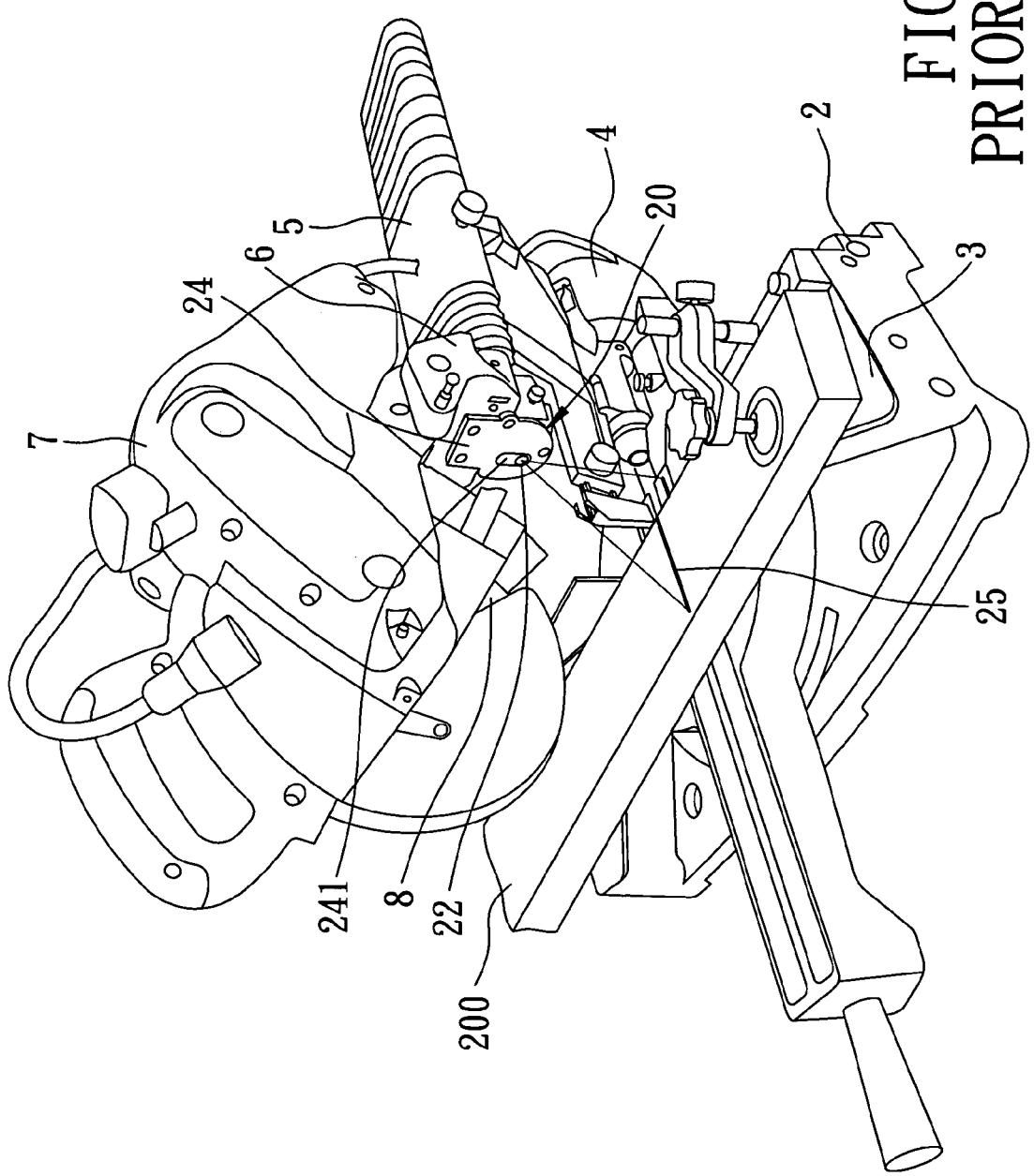
FIG. 2 is a perspective view of a second conventional circular sawing machine.
Figure 3:
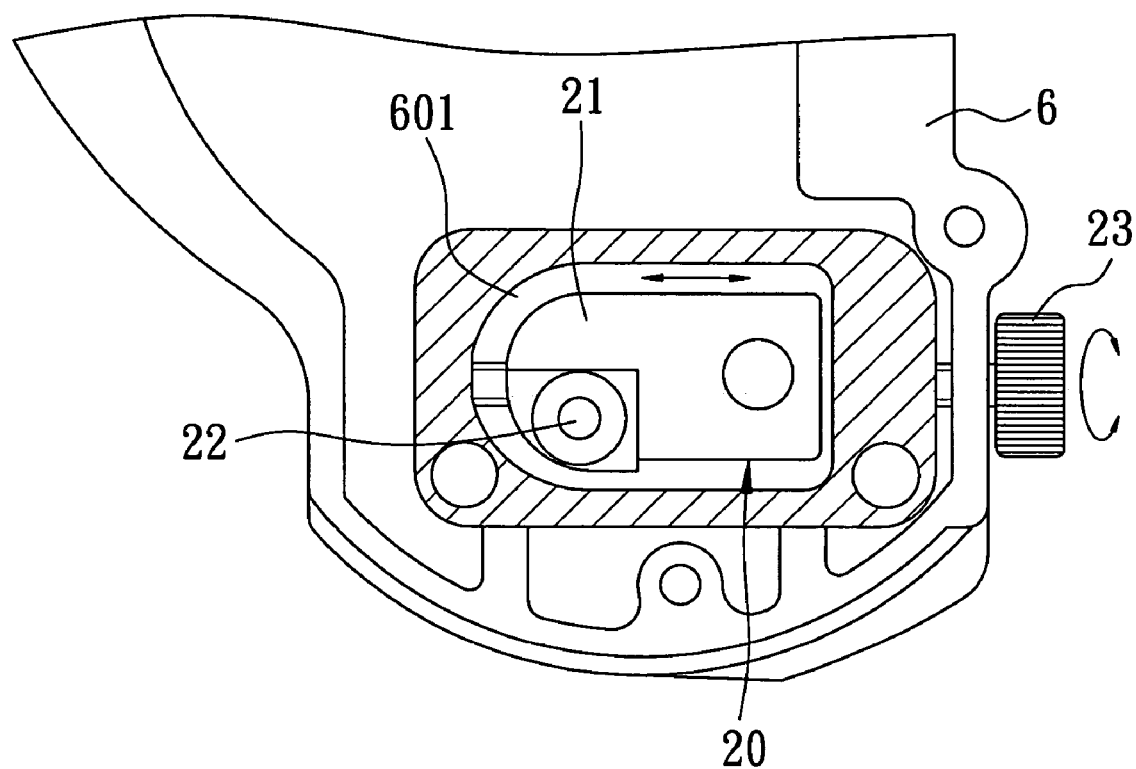
FIG. 3 is a sectional view of an indication device of the second conventional circular sawing machine.
Figure 4:
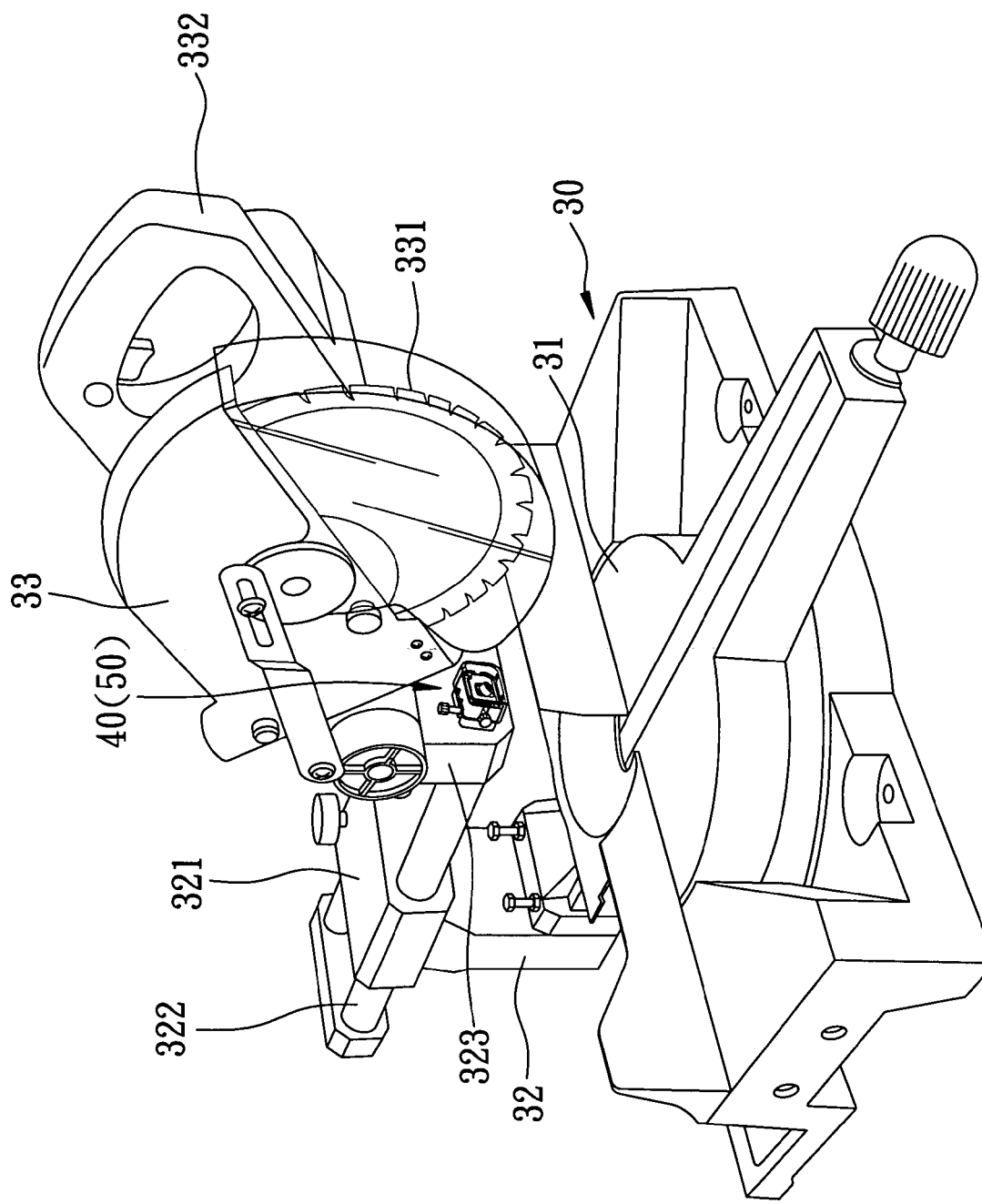
FIG. 4 is a perspective view of the preferred embodiment of a circular sawing machine according to this invention.
Figure 5:
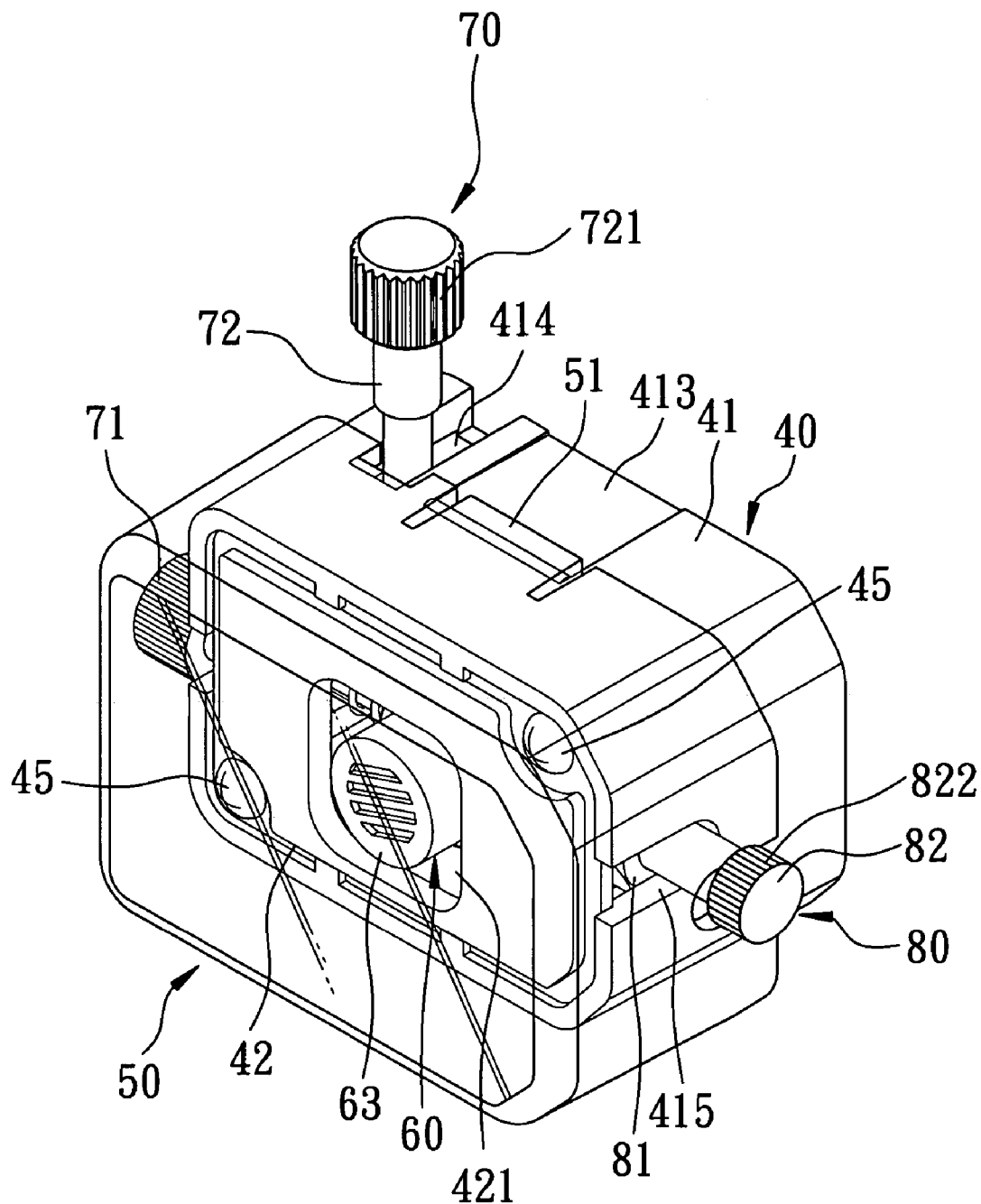
FIG. 5 is an assembled perspective view of a multi-directional adjustable laser indication device of the preferred embodiment.
Figure 6:
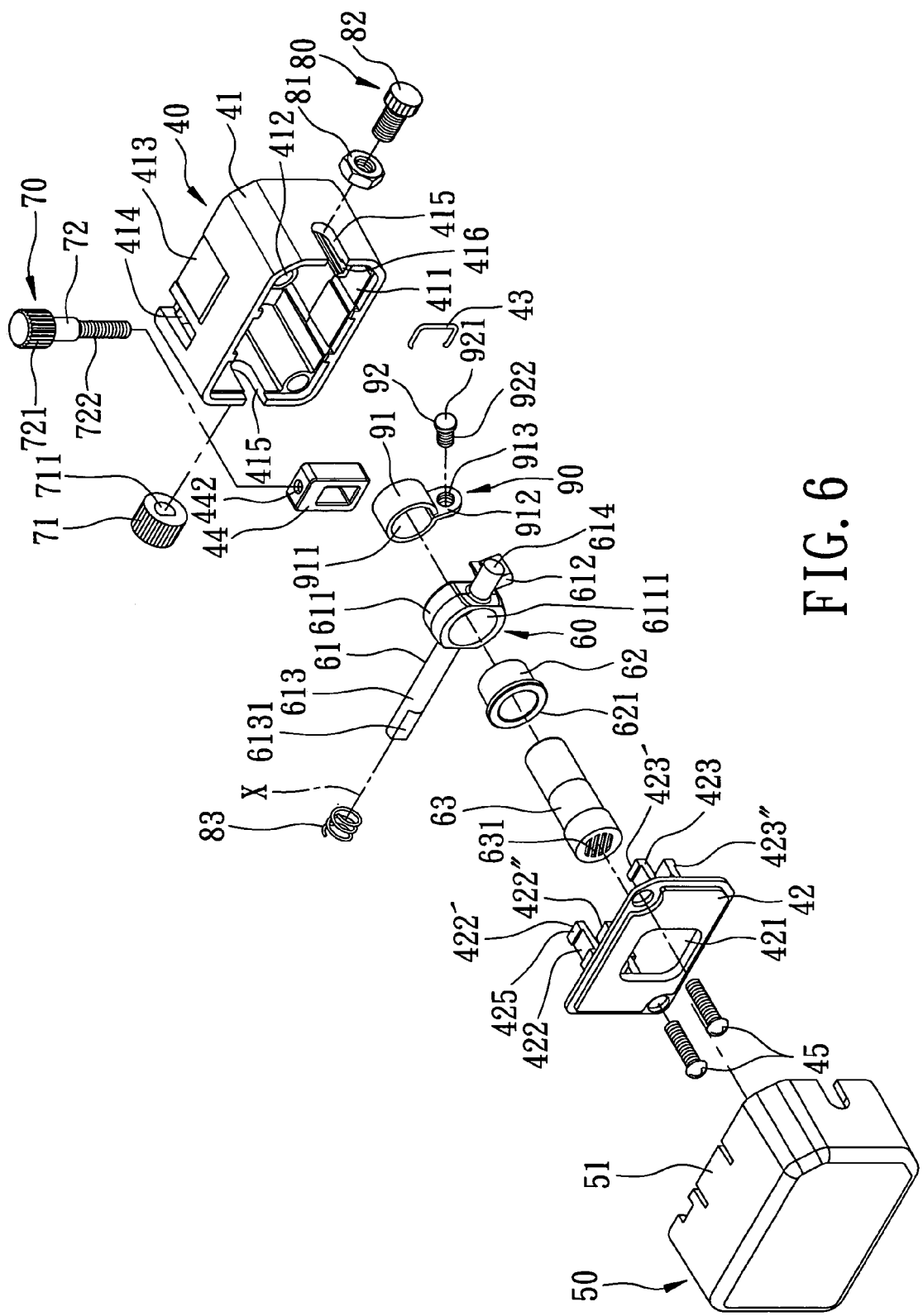
FIG. 6 is an exploded perspective view of the indication device of the preferred embodiment.
Figure 7:
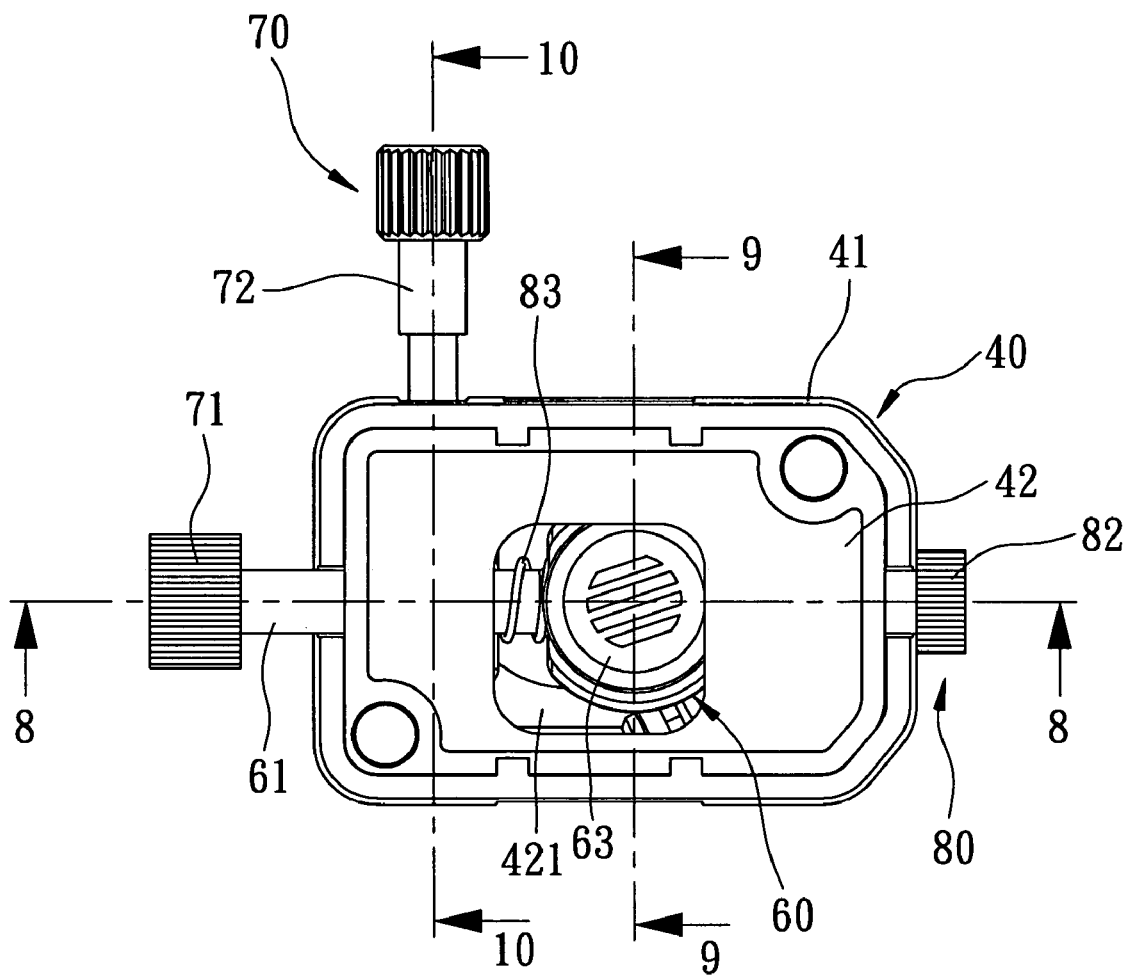
FIG. 7 is a front side view of the indication device of the preferred embodiment.

Referring to FIGS. 4, 5, 6, 7, 8, 9, 10, and 11, the preferred embodiment of a circular sawing machine 30 according to this invention is shown to include an elongated worktable 31, a base post unit 32, a cutting unit 33, and a multi-directional adjustable laser indication device.

The base post unit 32 is disposed on a rear end of the worktable 31, and includes a base seat 321, two parallel sliding rods 322 disposed slidably on the base seat 321, and a front supporting seat 323 fixed on the front ends of the sliding rods 322.

The cutting unit 33 is disposed rotatably on the front supporting seat 323 of the base post unit 32, and includes a saw blade 331 and a handle 332.

The indication device includes a body 40, a dust shield 50, a laser device 60, an angle-adjusting unit 70, a transverse adjusting unit 80, and a parallelism correcting unit 90.

The body 40 is connected fixedly to and is disposed in front of the front supporting seat 323 of the base post unit 32, and includes a housing 41, a cover plate 42, a C-shaped rod 43, a rectangular frame 44, and two lock bolts 45.

The housing 41 has a front end opening 411, two through holes 412, two retaining grooves 413 formed respectively in a top surface of a top wall of the housing 41 and a bottom surface of a bottom wall of the housing 41, an open-ended slot 414 formed through the top wall, two open-ended slots 415 formed respectively through front ends of left and right vertical walls of the housing 41, and an L-shaped supporting plate 416 extending from an inner surface of the left vertical wall at a position immediately under the corresponding slot 415. The lock bolts 45 extend respectively through the through holes 412 in the housing 41 to engage threaded holes (not shown) in the front supporting seat 323 of the base post unit 32 so as to fix the housing 41 to the front supporting seat 323.

The cover plate 42 is connected fixedly to the housing 41 by the lock bolts 45, covers the front end opening 411 in the housing 41, and has a rectangular hole 421 formed therethrough, and a rear side surface that is formed with left and right bearing seats 423, 422. The left and right bearing seats 423, 422 are arranged along a transverse direction of the worktable 31. Each of the left and right bearing seats 423, 422 includes a horizontal upper clamping plate 423', 422' extending integrally and rearwardly from the cover plate 42 and having a curved slot 424 (see FIG. 10) formed in a bottom surface thereof and a rear end projection 425 formed in a top surface thereof, and a horizontal lower clamping plate 423", 422" extending integrally and rearwardly from the cover plate 42 and having a curved slot 424 (see FIG. 10) formed in a top surface thereof and a rear end projection 425 formed in a bottom surface thereof. Each of the slots 424 has two open ends, and extends along the transverse direction of the worktable 31.

Figure 8:
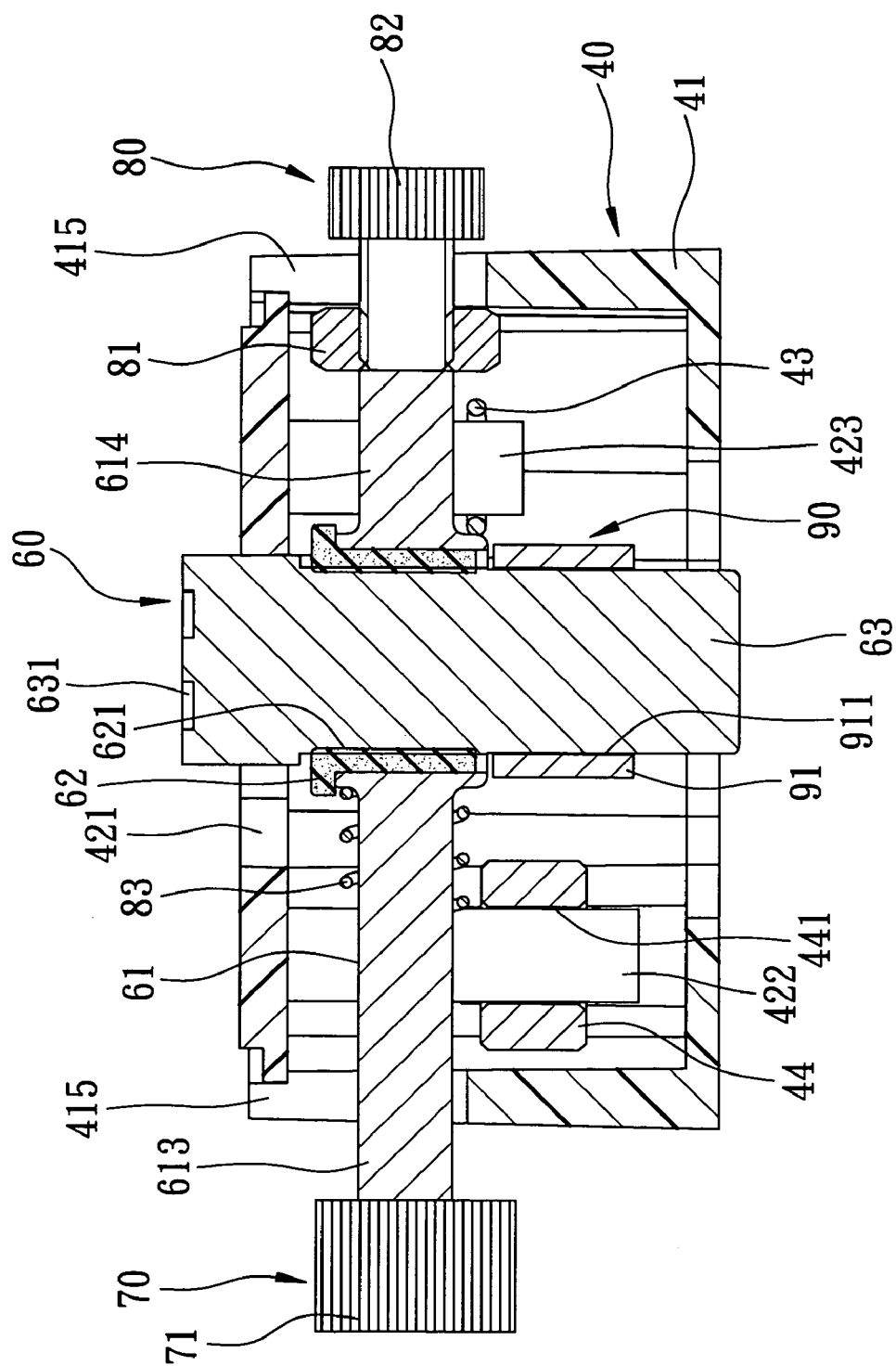
FIG. 8 is a sectional view of the indication device of the preferred embodiment, taken along Line 8-8 in FIG. 7.
Figure 9:
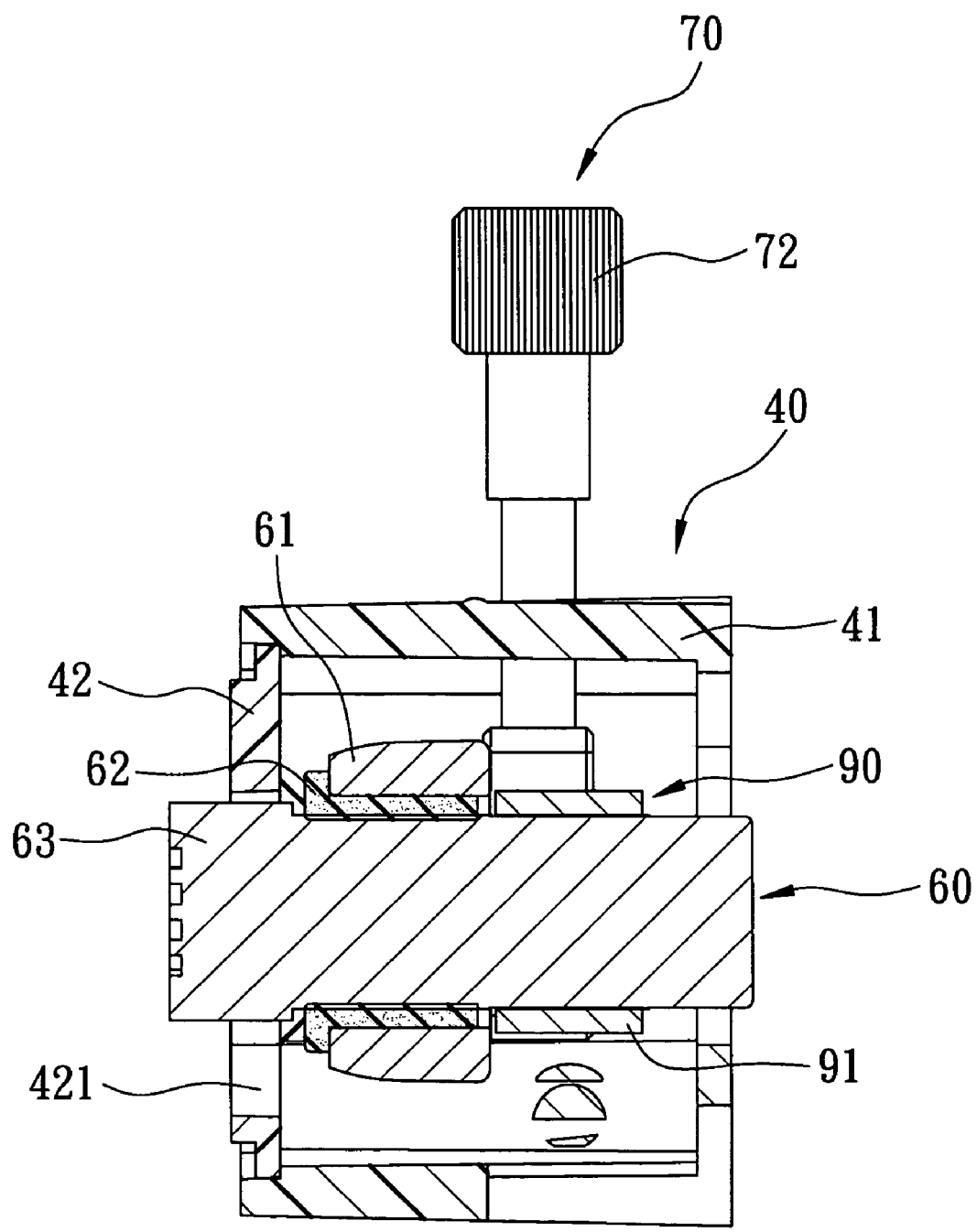
FIG. 9 is a sectional view of the indication device of the preferred embodiment, taken along Line 9-9 in FIG. 7.
Figure 11:
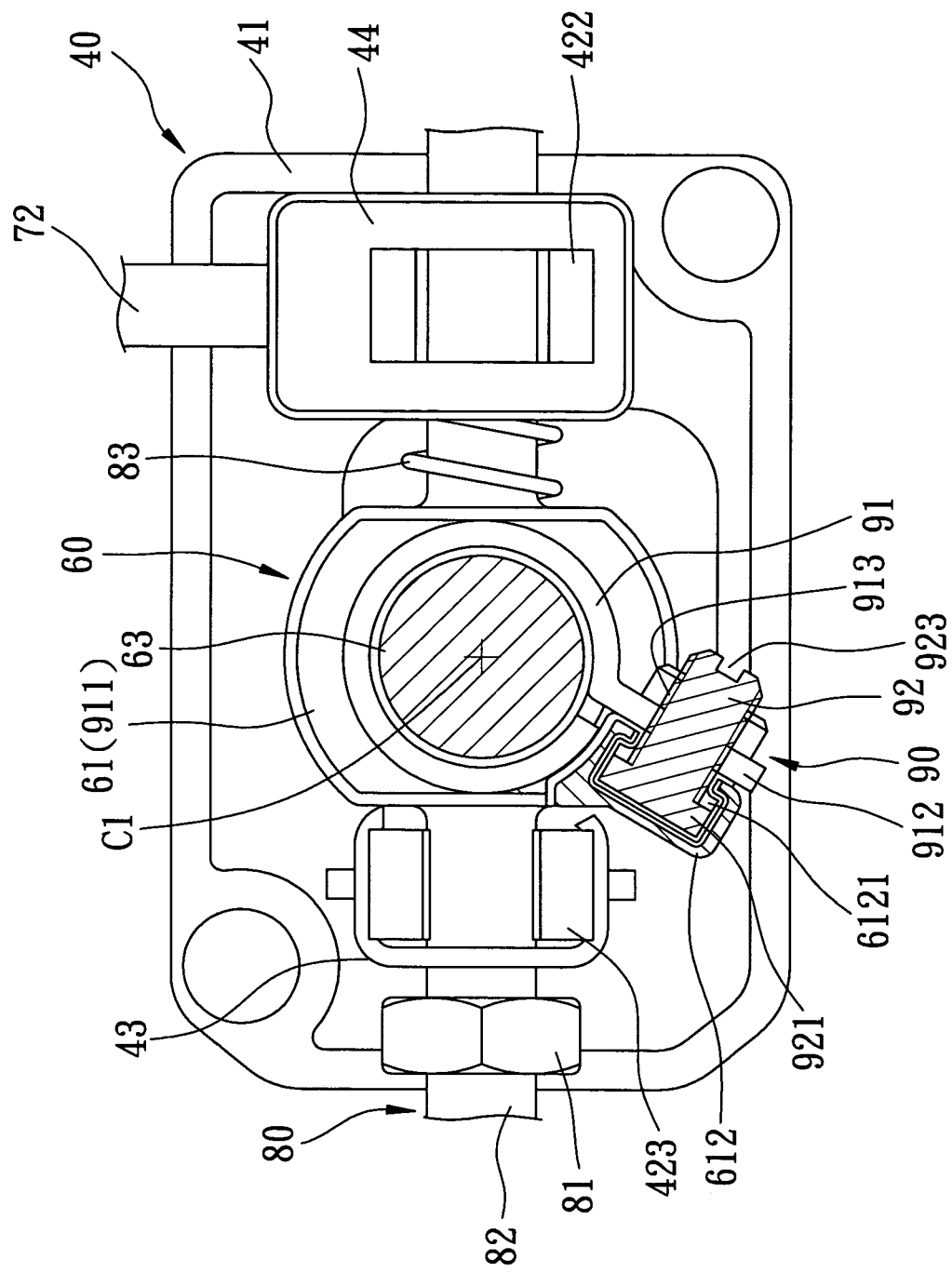
FIG. 11 is a rear view of the indication device of the preferred embodiment, illustrating a parallelism correcting unit.

The C-shaped rod 43 is sleeved around the upper and lower clamping plates 423', 423" of the left bearing seat 423, as shown in FIGS. 8 and 11. The projections 425 of the left bearing seat 423 can prevent removal of the C-shaped rod 43 from the left bearing seat 423.

Figure 10:
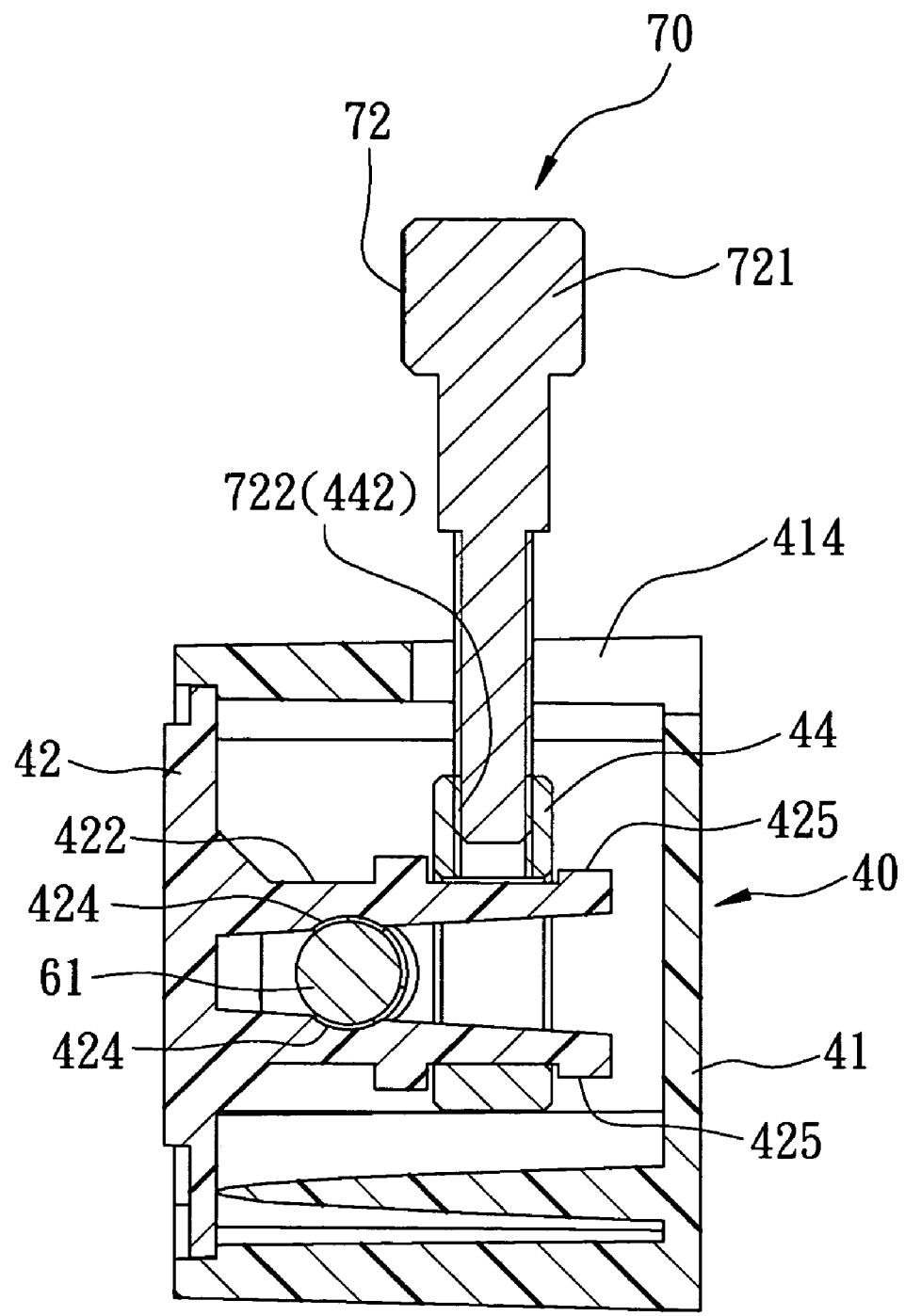
FIG. 10 is a sectional view of the indication device of the preferred embodiment, taken along Line 10-10 in FIG. 7.

The frame 44 is sleeved around the upper and lower clamping plates 422', 422" of the right bearing seat 422, as shown in FIGS. 10 and 11, and is formed with a threaded hole 442. The projections 425 of the right bearing seat 422 can prevent removal of the frame 44 from the right bearing seat 422.

The dust shield 50 is transparent, is sleeved on a front end of the housing 41, and has top and bottom walls that are formed with retaining tongues 51, which engage respectively the retaining grooves 413 in the housing 41. As such, the dust shield 50 is attached to the housing 41.

The laser device 60 includes a support rod 61, a cushioning sleeve 62, and a laser lamp 63. The support rod 61 extends along the transverse direction of the worktable 31, and includes a lamp-receiving portion 611, a bolt-limiting seat 612 extending from the lamp-receiving portion 611, a long rod portion 613 extending rightwardly from the lamp-receiving portion 611, and a short rod portion 614 extending leftwardly from the lamp-receiving portion 611. The cushioning sleeve 62 is sleeved around an intermediate portion of the laser lamp 63 in a close fitting manner, and is formed with a front end flange 621 extending radially and outwardly therefrom. The lamp-receiving portion 611 is formed with a central hole 6111 extending along a longitudinal direction of the worktable 31, is sleeved around the cushioning sleeve 62 in a close fitting manner, and has a front end surface that abuts against the front end flange 621 of the cushioning sleeve 62. As such, the laser lamp 63 is fixed on the support rod 61, and has a front emitting end 631 projects from the cover plate 42 through the hole 421 so as to form a visual indication line on the worktable 31. The indication line is parallel to the saw blade 331. The long rod portion 613 of the support rod 61 extends from the body 40 through the slot 415 in the right vertical wall of the housing 41, is clamped between the upper and lower clamping plates 422' 422" of the right bearing seat 422, and engages the curved slots 424 in the right bearing seat 422. The short rod portion 614 of the support rod 61 is clamped between the upper and lower clamping plates 423', 423" of the left bearing seat 423, and engages the curved slots 424 in the left bearing seat 422. As such, the support rod 61 is disposed rotatably and movably within the body 40, is rotatable about a central axis (X) (see FIG. 6) thereof, and is movable along the transverse direction of the worktable 31.

Figure 12:
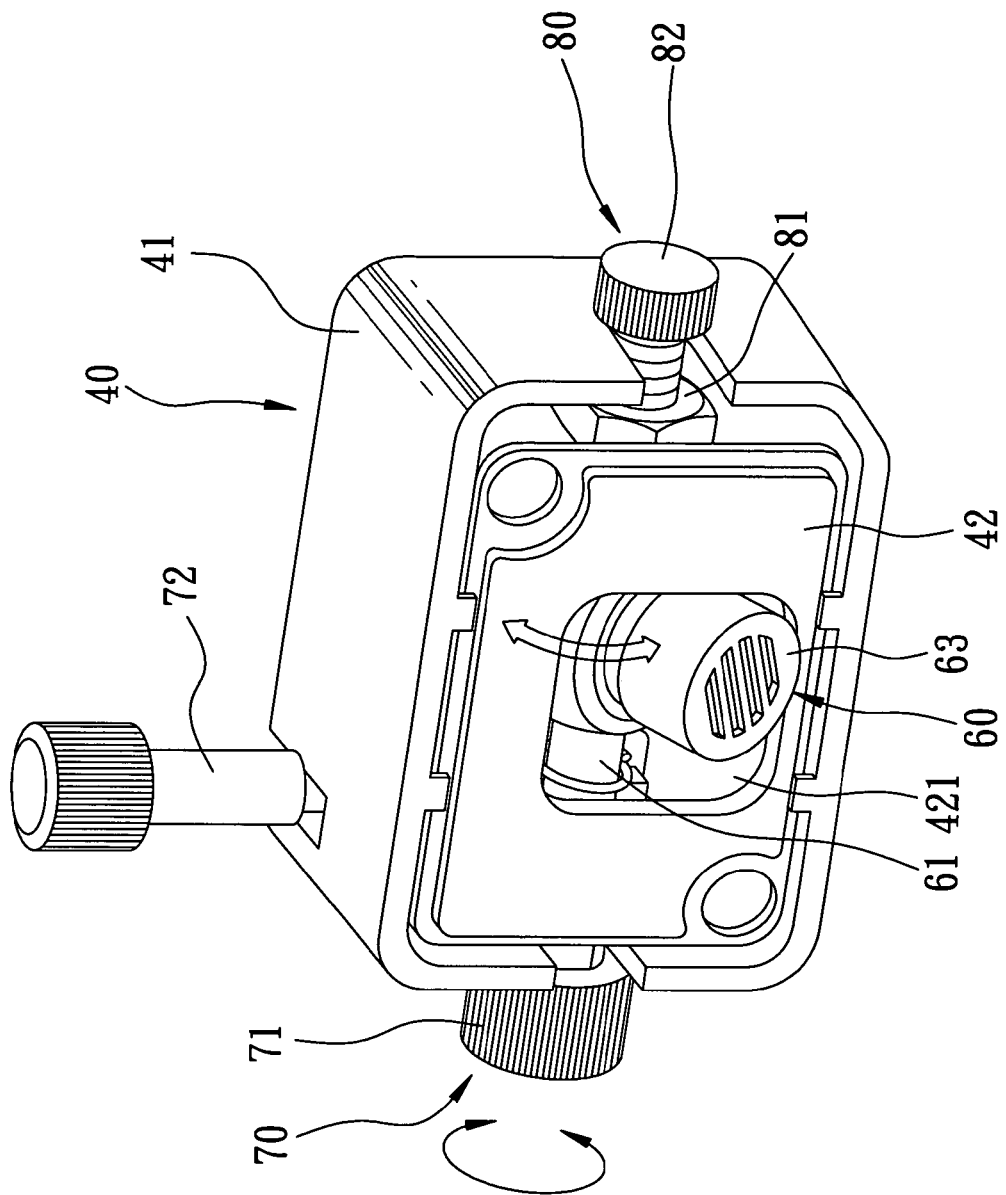
FIG. 12 is an assembled perspective view of the indication device of the preferred embodiment, illustrating the operation of an angle-adjusting unit.
Figure 13:
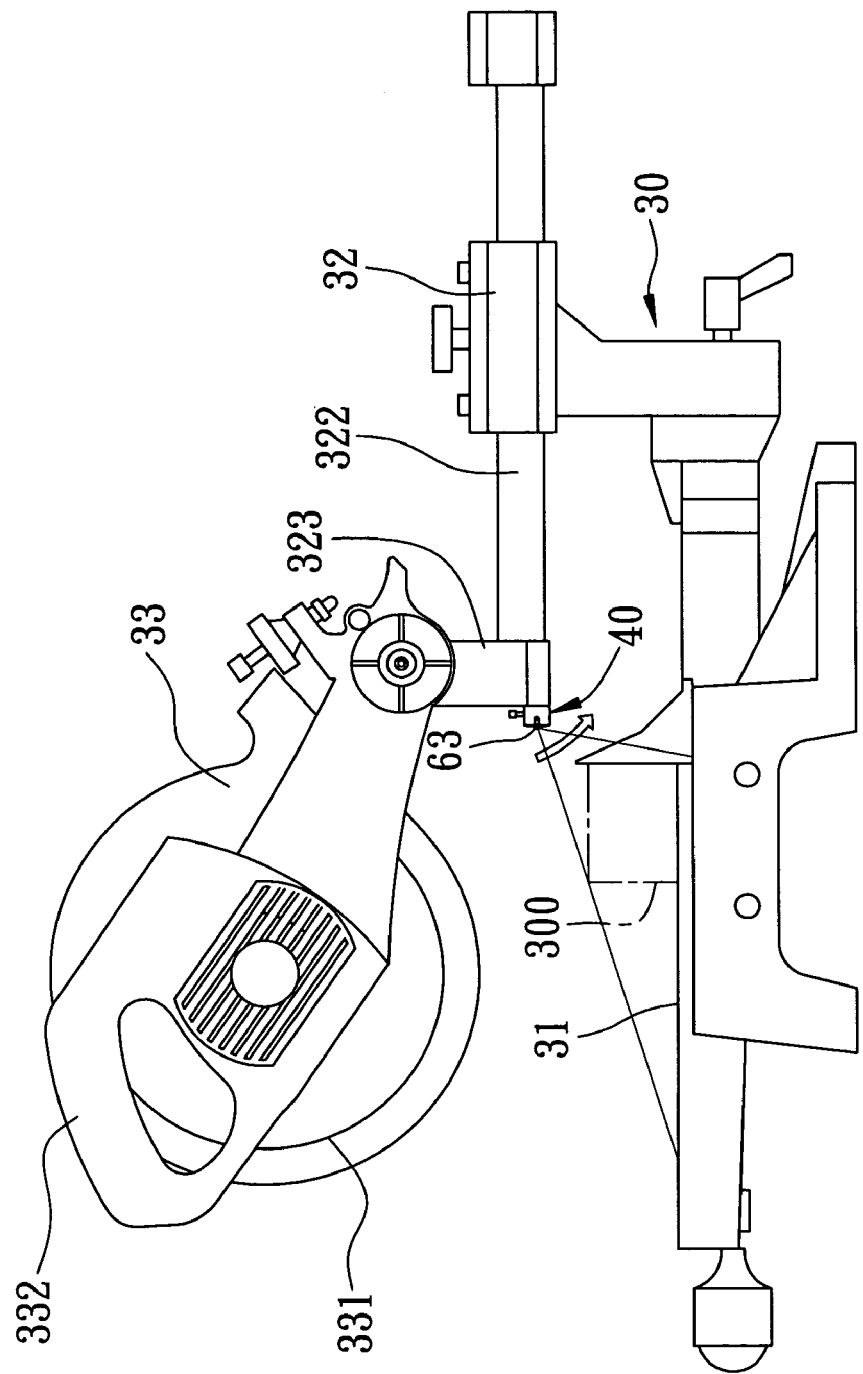
FIG. 13 is a side view of the preferred embodiment, illustrating how an indication line is formed on a narrower workpiece.
Figure 14:
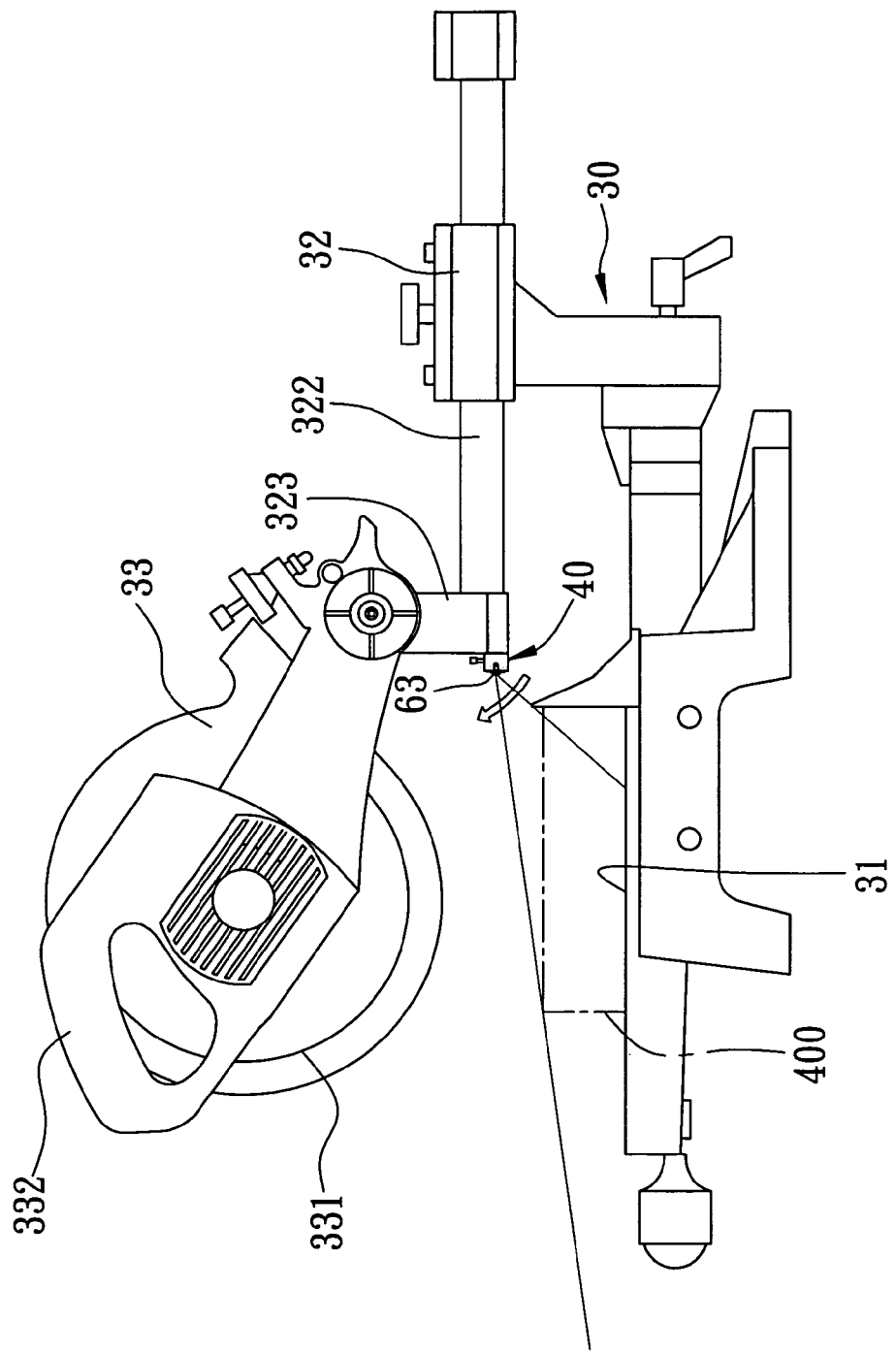
FIG. 14 is a side view of the preferred embodiment, illustrating how an indication line is formed on a wider workpiece.

The angle-adjusting unit 70 includes an adjusting member 71 disposed outwardly of the body 40 and connected to the support rod 61 so as to rotate synchronously with the support rod 61 about the central axis (X) of the support rod 61, and a locking member 72 for locking the support rod 61 releasably within the body 40. The adjusting member 71 is configured as an externally splined knob, and has an end surface that is formed with a hole 711 which engages fittingly a non-circular cross-sectioned outer end 6131 of the long rod portion 613 of the support rod 61 so as to prevent relative rotation therebetween. The locking member 72 is configured as a lock bolt, engages the threaded hole 442 in the frame 44, and presses the upper clamping plate 422' toward the lower clamping plate 422" so as to lock the support rod 61 within the body 40. When the locking member 72 is loosened, the adjusting member 71 can be rotated so as to adjust the angle of the laser lamp 63, as shown in FIG. 12. As a consequence, when a narrower workpiece 300 (see FIG. 13) is to be cut, the length of the indication line can be reduced. When a wider workpiece 400 (see FIG. 14) is to be cut, the length of the indication line can be increased.

Figure 15:
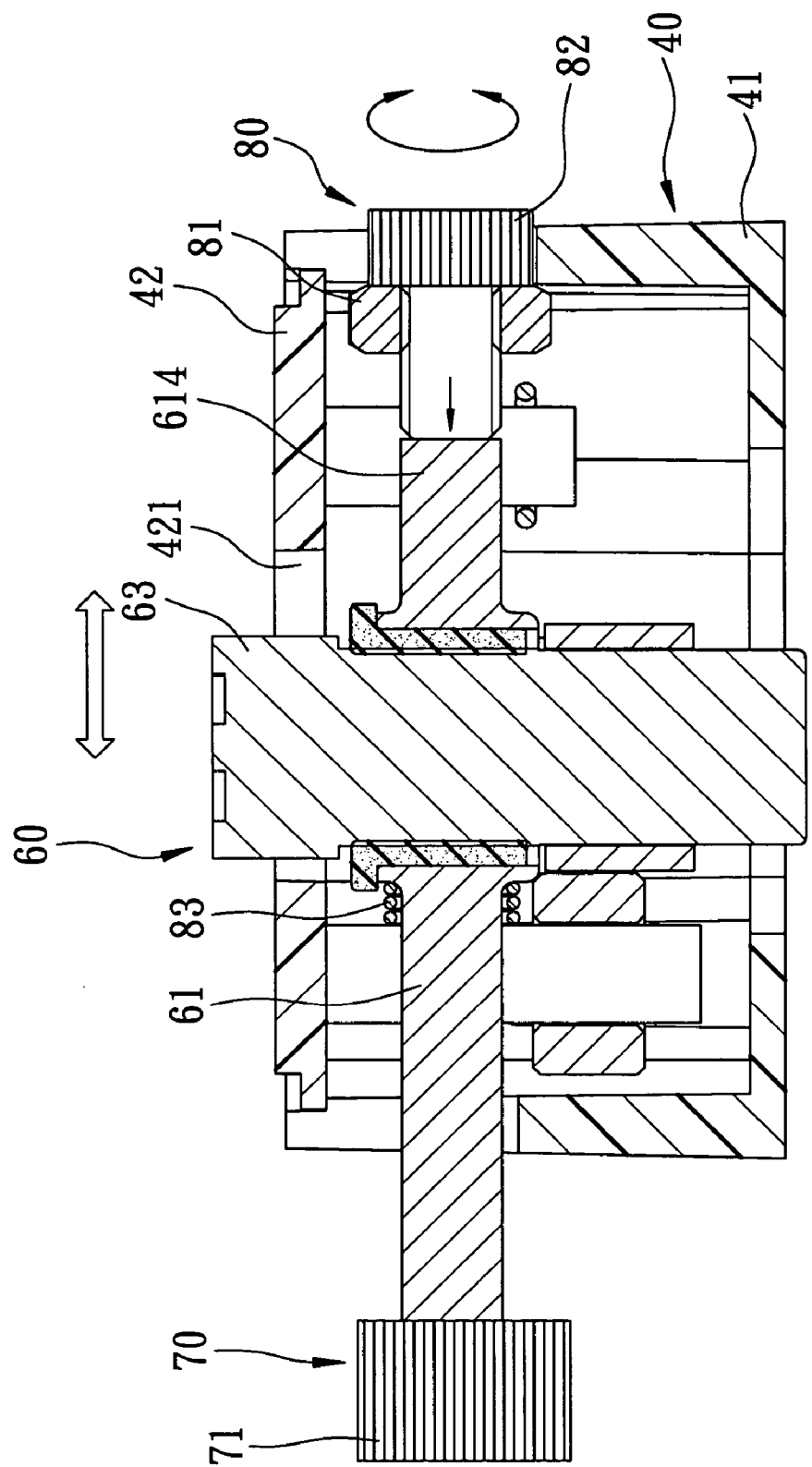
FIG. 15 is a sectional view of the indication device of the preferred embodiment, illustrating the operation of a transverse adjusting unit.

The transverse adjusting unit 80 includes a nut 81 confined and fixed between the L-shaped supporting plate 416 and the left vertical wall of the housing 41, an adjustment bolt 82 engaging the nut 81 and abutting against a left end surface of the support rod 61, and a coiled compression spring 83 sleeved on the long rod portion 613 of the support rod 61 between the right vertical wall of the housing 41 and the lamp-receiving portion 611 so as to press the left end surface of the support rod 61 against the adjustment bolt 82. When the locking member 72 is loosed, the adjustment bolt 82 can be rotated to move the support rod 61 along the transverse direction of the worktable 31, as shown in FIG. 15. The adjustment bolt 82 extends through the slot 415 in the left vertical wall of the housing 41, and has a splined surface 822.

Figure 16:
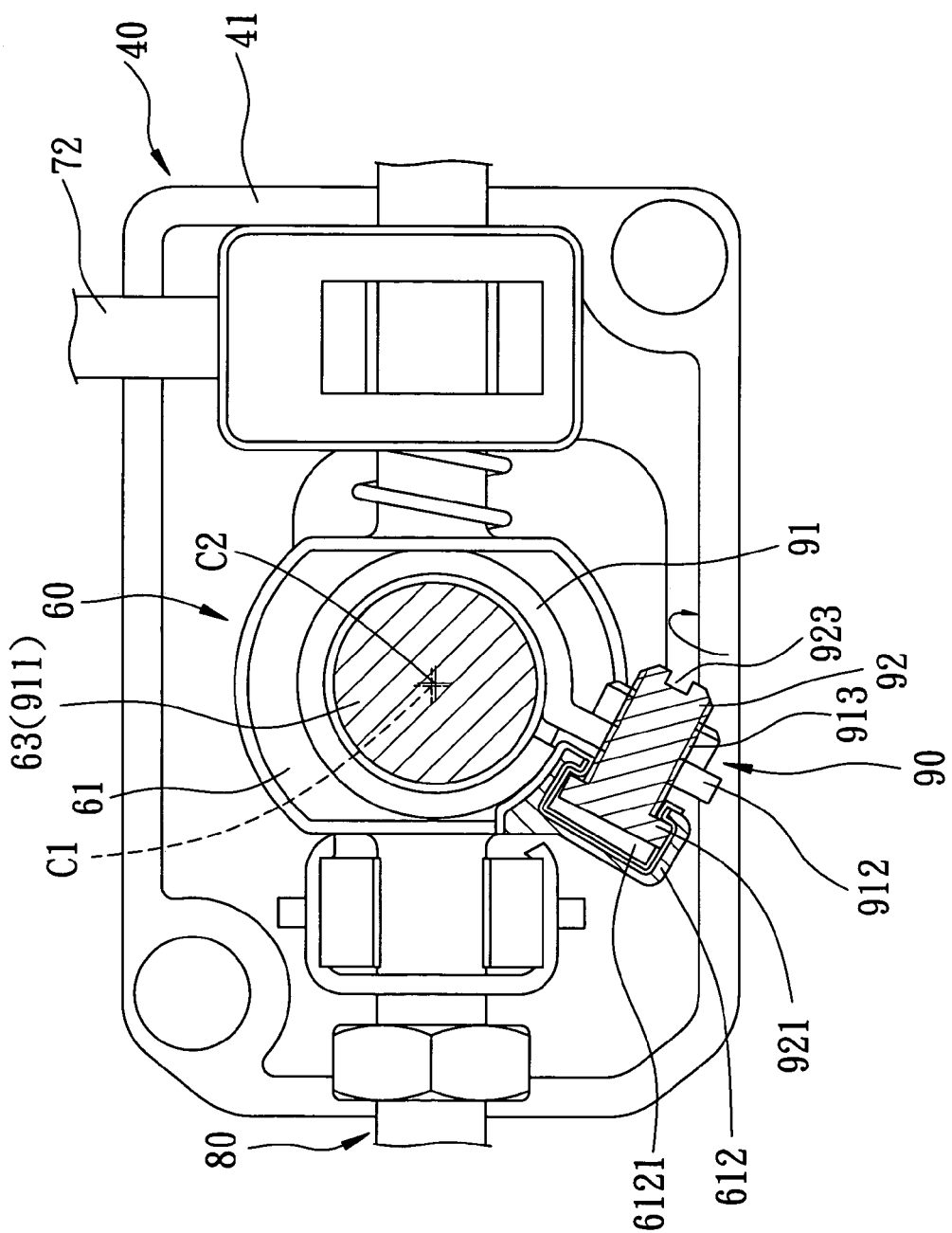
FIG. 16 is a sectional view of the indication device of the preferred embodiment, illustrating the operation of the parallelism correcting unit.

The parallelism correcting unit 90 includes a hoop 91, and a micro-adjusting bolt 92. The hoop 91 is sleeved fixedly on a rear end of the laser lamp 63, has a central hole 911 and a radially and outwardly extending lug 912 that is formed with a threaded hole 913 therethrough. The micro-adjusting bolt 92 has a head 921 and a threaded portion 922. The head 921 is confined within a restricting hole 6121 (see FIG. 11) in the bolt-limiting seat 612 of the support rod 61 so as to prevent movement of the micro-adjusting bolt 92 relative to the support rod 61 while still permitting rotation of the micro-adjusting bolt 92 relative to the support rod 61. Therefore, the micro-adjusting bolt 92 can be rotated to change the position of the center of the rear end of the laser lamp 63 from a first position (C1) (see FIG. 16), which is deflected from the center of a front end of the laser lamp 63 along the longitudinal direction of the worktable 31, to a second position (C2), which is aligned with the center of the front end of the laser lamp 63 along the longitudinal direction of the worktable 31.

With this invention thus explained, it is apparent that numerous modifications and variations can be made without departing from the scope and spirit of this invention. It is therefore intended that this invention be limited only as indicated by the appended claims.

We claim:

1. A circular sawing machine comprising:
   an elongated worktable having a front end and a rear end;
   a base post unit disposed on said rear end of said worktable;
   a cutting unit disposed rotatably on said base post unit and including a saw blade; and
   an indication device including
   a body connected fixedly to and disposed in front of said base post unit and disposed under said cutting unit,
   a laser device including a support rod disposed rotatably and movably within said body and extending along a transverse direction of said worktable, and a laser lamp fixed on said support rod so as to form a visual indication line on said worktable, said indication line being parallel to said saw blade, said support rod being rotatable about a central axis thereof and being movable along said transverse direction of said worktable,
   an angle-adjusting unit including an adjusting member disposed outwardly of said body and connected to said support rod so as to rotate synchronously with said support rod about said central axis of said support rod, and a locking member for locking said support rod releasably within said body, and
   a transverse adjusting unit disposed on said body and operable to move said support rod along said transverse direction of said worktable.

2. The circular sawing machine as claimed in claim 1, wherein said body of said indication device includes a housing having a front end opening, and a cover plate connected fixedly to said housing and covering said front end opening in said housing, said cover plate having a rear side surface that is formed with two bearing seats that are arranged along said transverse direction of said worktable and that receive rotatably and movably said support rod thereon.

3. The circular sawing machine as claimed in claim 2, wherein each of said bearing seats includes a horizontal upper clamping plate extending integrally and rearwardly from said cover plate and having a curved slot formed in a bottom surface thereof, and a horizontal lower clamping plate extending integrally and rearwardly from said cover plate at a position under said upper clamping plate and having a curved slot formed in a top surface thereof, each of said slots in said upper and lower clamping plates extending along said transverse direction of said worktable and having two open ends, said support rod extending between said upper and lower clamping plates of each of said bearing seats and engaging said slots in said upper and lower clamping plates of said bearing seats.

4. The circular sawing machine as claimed in claim 3, wherein said indication device further includes a frame sleeved around said upper and lower clamping plates of one of said bearing seats and having a threaded hole, said locking member being configured as a lock bolt that engages said threaded hole in said frame and that presses said upper and lower clamping plates of said one of said bearing seats toward each other so as to clamp said support rod therebetween, thereby locking said support rod within said body.

5. The circular sawing machine as claimed in claim 1, wherein said indication device further includes a cushioning sleeve that is sleeved around said laser lamp in a close fitting manner and that is formed with a front end flange that extends radially and outwardly therefrom, said support rod including a lamp-receiving portion that is formed with a central hole extending along a longitudinal direction of said worktable and that is sleeved around said cushioning sleeve in a close fitting manner, said lamp-receiving portion having a front end surface that abuts against said front end flange of said cushioning sleeve.

6. The circular sawing machine as claimed in claim 5, wherein said indication device further includes a parallelism correcting unit, said laser lamp having an intermediate portion disposed within said lamp-receiving portion of said support rod, and a rear end, said parallelism correcting unit including:
   a hoop sleeved fixedly on said rear end of said laser lamp and having a radially and outwardly extending lug that is formed with a threaded hole therethrough; and
   a micro-adjusting bolt having a head connected to said support rod so as to prevent movement of said micro-adjusting bolt relative to said support rod while still permitting rotation of said micro-adjusting bolt relative to said support rod, rotation of said micro-adjusting bolt resulting in change in position of a center of said rear end of said laser lamp within said body of said indication device so as to adjust parallelism of said indication line and said saw blade.

7. The circular sawing machine as claimed in claim 1, wherein said support rod includes a long rod portion that has a non-circular cross-sectioned outer end which projects outwardly from said body of said indication device, said adjusting member being configured as an externally splined knob that has an end surface that is formed with a hole which engages fittingly said outer end of said long rod portion of said support rod so as to prevent relative rotation therebetween.

8. The circular sawing machine as claimed in claim 1, wherein said support rod of said laser device has an end surface, said transverse adjusting unit of said indication device including a nut fixed within said body, an adjustment bolt engaging said nut and abutting against said end surface of said support rod, and a coiled compression spring sleeved on said support rod so as to press said end surface of said support rod against said adjustment bolt, rotation of said adjustment bolt resulting in movement of said support rod along said transverse direction of said worktable.

9. The circular sawing machine as claimed in claim 8, wherein said body of said indication device includes a vertical wall that has a front end which is formed with an open-ended slot therethrough, said adjustment bolt extending through said slot in said vertical wall, said vertical nil further having an inner surface that is formed with an L-shaped supporting plate which extends therefrom at a position immediately under said slot in said vertical wall, said nut being disposed between said vertical wall and said L-shape supporting plate such that movement of said nut within said body along said transverse direction of said worktable is prevented.

* * * * *